United States Patent [19]

Shimanuki

[11] Patent Number: 5,111,501
[45] Date of Patent: May 5, 1992

[54] TELEPHONE TERMINAL DEVICE HAVING SPEECH RECOGNITION UNIT

[75] Inventor: Masanobu Shimanuki, Yokohama, Japan

[73] Assignee: Kabushiki Kaisha Toshiba, Kawasaki, Japan

[21] Appl. No.: 476,837

[22] Filed: Feb. 8, 1990

[30] Foreign Application Priority Data

Feb. 9, 1989 [JP] Japan .................. 1-30614

[51] Int. Cl.$^5$ ............................................. H04M 1/26
[52] U.S. Cl. .................................. 379/355; 379/354; 379/389; 379/88
[58] Field of Search ............... 379/389, 376, 354, 355, 379/88

[56] References Cited

U.S. PATENT DOCUMENTS

| | | | |
|---|---|---|---|
| 4,731,811 | 3/1988 | Dubus | 379/355 X |
| 4,837,808 | 6/1989 | Immendorfer et al. | 379/355 X |
| 4,853,953 | 8/1989 | Fujisaki | 379/355 X |
| 4,864,622 | 9/1989 | Iida et al. | 379/355 X |
| 4,870,686 | 9/1989 | Gerson et al. | 379/355 X |
| 4,873,714 | 10/1989 | Ishii et al. | 379/354 X |
| 4,903,291 | 2/1990 | Tsurufuji et al. | 379/389 X |
| 4,928,302 | 5/1990 | Kaneuchi et al. | 379/354 X |
| 4,945,557 | 7/1990 | Kaneuchi et al. | 379/354 X |
| 4,949,374 | 8/1990 | Ishii et al. | 379/354 X |
| 4,961,212 | 10/1990 | Marui et al. | 379/354 X |

*Primary Examiner*—James L. Dwyer
*Assistant Examiner*—M. Shehata
*Attorney, Agent, or Firm*—Finnegan, Henderson, Farabow, Garrett, and Dunner

[57] ABSTRACT

A telephone terminal device equipped with a transmitter microphone, a receiver, a speech recognition unit that receives and recognizes speech signals from the transmitter microphone and a circuit to reduce the level of signals send from a telephone network to the receiver when the speech recognition unit receives speech signals from the transmitter microphone. Further, this device is preferably equipped with a speech reproduction unit that reproduces the speech information stored in a memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

10 Claims, 4 Drawing Sheets

TELEPHONE TERMINAL DEVICE HAVING SPEECH RECOGNITION UNIT

BACKGROUND OF THE INVENTION

This invention relates to a telephone terminal device with a function to perform the predetermined operation corresponding to speech signals by recognizing the speech signals from telephone transmitters.

As the telephone terminal device of this type is known, a telephone having a speech origination function is described below. That is, pieces of speech information are stored in a built-in memory by making comparisons to the telephone numbers in advance. When an originating call is made, a speech signal is input from the handset transmitter microphone, and it is checked against the speech information stored in the memory by means of the built-in speech recognition device. When, as a result of the checkup, the speech information corresponding to the input speech signal is found, the telephone number stored in correspondence to the speech information is read out and converted into a dial pulses or multi-frequency signals and then sent out to the telephone network (office line). At the time of the origination as above-mentioned, the handset is made to off-hook in order to enable the speech signal to be input from the microphone. When the handset is made to off-hook, the telephone network switch is automatically turned ON, and the telephone network is acquired. Once the network is acquired, the dial tone from the telephone office is sent through the circuit into this telephone terminal device and sent to the telephone receiver.

In the conventional telephone terminal device as explained above, part of the dial tone sent to the receiver enters the microphone through an acoustic coupling, and is thus sent to the speech recognition device in superposition on speech signals to the telephone transmitter, thus making the speech signal identification difficult. Further, the conventional telephone device is equipped for checking whether or not the speech recognition device is functioning normally. In this checkup operation, first the speech signal is input from the telephone transmitter, analyzed and verified with the speech recognition device, and when the speech information that corresponds to this speech signal is found, the speech data preset in the speech memory corresponding to this information is read out, reproduced and sent out to the receiver. At this time, since the dial tones from the telephone network enter the receiver together with the reproduced speech signals, these reproduced speech signals representing the recognition result become mixed with the dial tone, thus making them very hard to understand. Moreover, when in the registration of speech information and operation check of the speech recognition device, the ringing signal sounds by a call incoming while the receiver is receiving speech signals, the ringing signal enters the microphone, thus also causing of interference with registration and verification.

SUMMARY OF THE INVENTION

The object of this invention is to protect the various operations related to speech recognition from interference by dial tones or callers.

One aspect of this invention provides a telephone terminal device equipped with a transmitter microphone, a receiver and a speech recognition unit which receives and recognizes speech signals from the microphone under the condition where a telephone network is acquired, which comprises a controller that generates a control signal when the speech recognition unit is receiving speech signals from the transmitter microphone, and signal level reducing means responsive to the control signal for reducing the level of signals sent from the telephone network to the receiver. In this device, when the caller inputs speech signals into the speech recognition device, the interference by the dial tones from the telephone network can be prevented.

Another aspect of this invention provides a telephone terminal device equipped with a telephone receiver, a speech recognition unit which receives and recognizes speech signals, and a speech reproduction means for reproducing, in response to recognition results from the speech recognition unit, the speech information stored in a memory in advance and for sending the speech information to the receiver under condition where the telephone network is acquired, the telephone terminal device comprising a controller which generates a control signal when the speech information from the speech reproduction means is sent to the receiver, and means responsive to the control signal for preventing transmission of the signals sent from the acquired telephone network into said receiver. In this device, when reproducing the speech information for verifying whether or not the speech recognition device functions normally, the interference by the dial tones from the telephone network can be prevented.

The further aspect of this invention provides a telephone terminal device having a transmitter microphone, a speech recognition unit which receives and recognizes speech signals from the transmitter microphone, a bell signal generating circuit which detects incoming call signals and generates bell signals, an electroacoustic transducer which receives the bell signals and generates ringing tones, the telephone terminal device comprising a controller which generates control signals when the speech recognition unit receives speech signals from the transmitter microphone, and means responsive to the control signal for preventing the bell signals from being sent from the bell signal generating circuit to the electroacoustic transducer. In this device, when there is a call incoming while the speech signal is input into the speech recognition device from the telephone transmitter, the interference due to the ringing tone can be prevented.

DESCRIPTION OF THE PREFERRED EMBODIMENT

Hereinafter a preferred embodiment of this invention will be described with reference to the diagrams depicted in the drawing figures.

Figure 1:
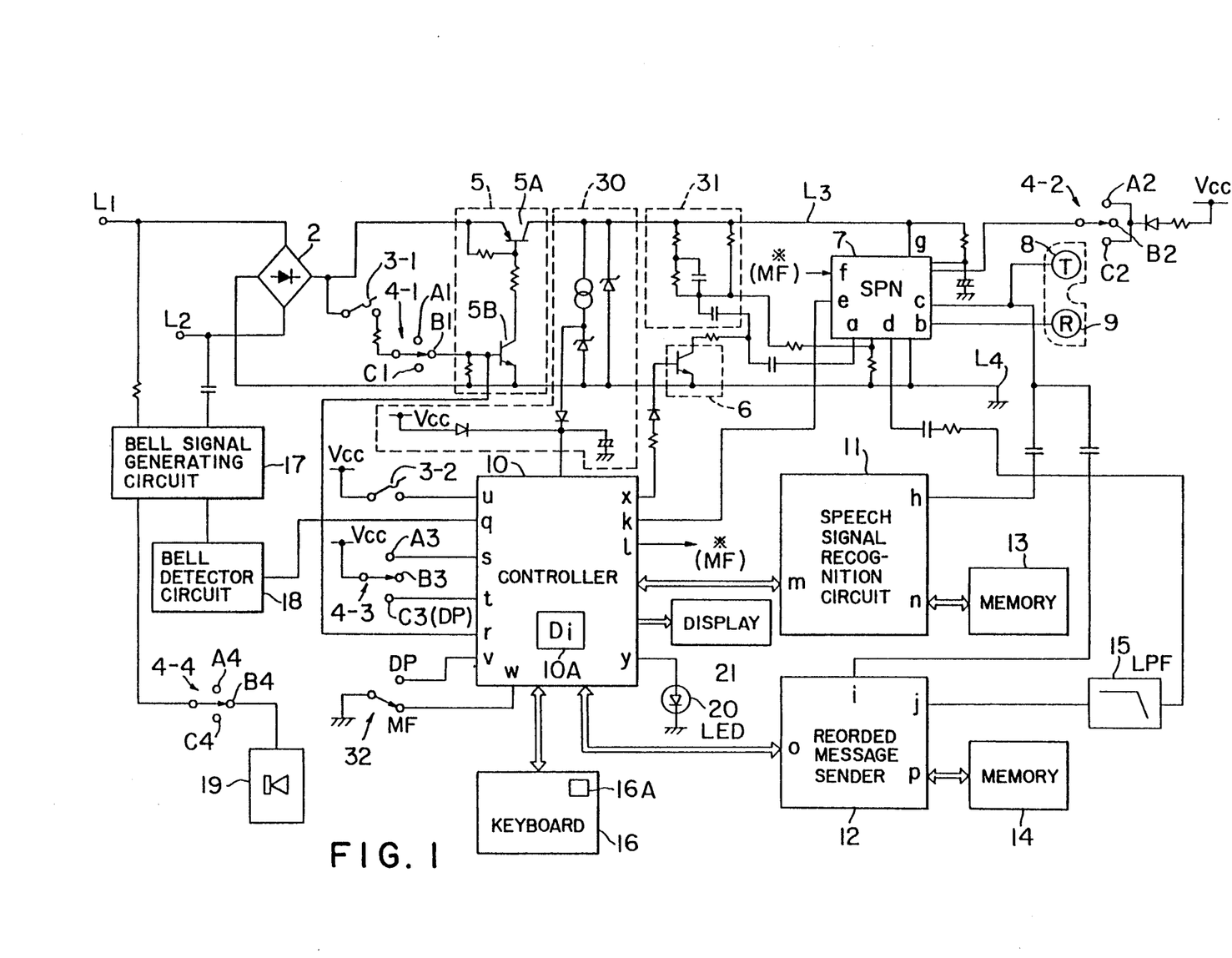
FIG. 1 is an overall circuit configuration diagram of the telephone terminal device according to an execution example of this invention.

FIG. 1 is an overall circuit configuration diagram of the telephone terminal device according to a preferred embodiment of this invention.

Referring to FIG. 1, the AC terminals of the rectifier bridge 2 are connected to the office line (telephone network) $L_1$, $L_2$, and the DC terminals of the rectifier bridge are connected on the plus side to $L_3$ and the minus side to $L_4$. In the speech line $L_3$, a transistor switch 5 to acquire the office line is inserted. Further, between the speech line $L_3$, $L_4$ are connected the power feeding circuit 30 which feeds power to the controller 10 and the speech network (hereinafter called "SPN") 7. To the SPN 7 are connected the handset transmitter 8 and receiver 9, respectively.

The SPN 7, as is evident from FIG. 1, is equipped with terminals denoted by signs a, b, c, d, e, f, g, etc. The terminal a, which is a received speech incoming terminal, is connected to the speech line $L_3$ via the side-tone eliminating circuit 31. Furthermore, between the terminal a and the minus-side speech line $L_4$, is connected a transistor 6 which makes up a muting circuit to have the received speech bypass the receiver 9. The terminal b, which is the received speech output terminal, is connected to the handset receiver 9. The terminal c, which is the transmitted speech input terminal, is connected to the handset transmitter microphone 8. The transmitter microphone 8 is also connected to the speech input terminal h of the speech recognition unit 11 and the speech input terminal i of the recorded message sender unit 12. The terminal d, which is the reproduced speech input terminal, is connected to the speech output terminal j of the recorded message sender unit 12 via the low-pass filter 15. The terminal e, which is the origination/speech selector terminal (hereafter "Di/-speech selector terminal"), is connected to the Di/-speech control output terminal k. The terminal f, which is the MF signal (multi-frequency signal) input terminal, is connected to the MF signal output terminal l of the controller 10. Further, the terminal g, which is the transmitted speech output terminal, is connected to the speech line $L_3$.

The SPN 7 is driven by the power fed from the office line when it is acquired, and by the power fed from the DC source Vcc via the selector switch 4-2 when the office line is not acquired.

In the operation mode of this telephone terminal device, there are 3 modes; the verification mode, speech mode and registration mode. The selector switch 4-2 has the contact $A_2$ as selected in the recognition mode, the contact $B_2$ as selected in the speech mode and the contact $C_2$ as selected in the registration mode, the contacts $A_2$ and $C_2$ being connected to the power source Vcc.

In the speech recognition unit 11, the speech input terminal h is connected with the transmitter microphone 8, the control data input/output terminal m is connected with the control unit 10 and the analysis data input/output terminal n is connected with the memory 13. The speech recognition unit 11 is provided with a registration function whereby the speech signal as received from the telephone transmitter 8 under the control of the control unit 10 is analyzed into its characteristics and the analysis data is written into the memory 13, and the speech recognition function where the analysis data of the speech signal received is collated with the analysis data preset in the memory 13, and the resulting checkup data is given to the controller.

In the recorded message sender 12, the speech input terminal i is connected with the telephone transmitter 8, the speech output terminal j is connected with the regenerative speech input terminal d of the SPN 7 via LPF 15, the control data terminal o is connected with the control unit 10 and the speech data terminal p is connected with the memory 14.

The recorded message sender 12 is provided with the recording function whereby the analog speech signal input into the terminal i, under the control of the control unit 10, is converted into a digital data and written into the specified address of the memory 14 and the reproduction function where the speech data as read out from the specified address of the memory 14 is converted into an analog signal and output from the terminal j. The recorded message sender 12 and memory 14 may be replaced by a tape recorder.

The keyboard 16, which is connected with the controller 10, is equipped with a dial key and a function key like the ordinary telephone keyboard, and an origination method selector key 16A. The origination method selector key 16A is used to make a choice between the ordinary dial origination method by the dial key manual operation and speech dial origination method. Instead of the manual selection using such a selector key 16, an automatic selection system may be adopted wherein pressing the dial key after off-hook selects the manual dial origination and inputting a speech signal after off-hook selects the speech dial origination.

The LED indicator 20, which is connected with the controller 10 is made to flicker under the control of the controller 10. The liquid-crystal indicator 21, which is connected with the controller 10 is made to display the originating dial number for the manual dial origination under the control of the controller 10, the verification result from the speech recognition unit 11 in the speech dial origination and so forth.

The bell signal generating circuit 17, which is connected with the office line $L_1$, $L_2$, outputs the bell signal to generate the ringing tone on receipt of the call sign from the office line $L_1$, $L_2$. To the output terminal of the circuit 17 is connected the bell detection circuit 18 and the speaker 19 via the selector switch 4-4. The bell detection circuit 18 is made to detect the bell signal from the bell signal generating circuit 17 and output the detected signal to the terminal q of the controller 10.

Here, the selector switch 4-4 which has the contact $A_4$ selected in the recognition mode, the contact $B_4$ selected in the speech mode and the contact $C_4$ selected in the registration mode, and to the contact $B_4$ corresponding to the speech mode is connected the speaker 19.

The switch 5 has a transistor 5A inserted in the plus-side speech line $L_3$ and a transistor 5B for driving the transistor 5A. The base of the drive transistor 5B is connected to the dial pulse (DP) output terminal r of the controller 10, and also to the speech line $L_3$ via the hook switch 3-1 and selector switch 4-1. The hook switch 3-1 is turned ON by the off-hook of the handset 8, 9. The selector switch 4-1 has the contacts $A_1$, $B_1$, $C_1$ corresponding to the verification mode, speech mode and registration mode respectively, and to the contact $B_1$ corresponding to the speech mode is connected the base of the drive transistor 5B.

To the mode set terminals s, t of the controller 10, is connected the DC power source Vcc via the selector switch 4-3. The selector switch 4-3 has the contacts $A_3$, $B_3$, $C_3$ corresponding to the verification mode, speech mode and registration mode respectively, and the recognition mode contact $A_3$ is connected to the terminal s, and the registration mode contact $C_3$ is connected to the terminal t. The selector switches 4-1, 4-2, 4-3, 4-4 are made capable of manual selection individually, and are formed to permit interlocking operation of the whole selector switches.

Further, to the hook information input terminal u of the controller 10, is connected the DC power source Vcc via the hook switch 3-2. This hook switch 3-2 turns to ON with the handset off-hook. The dial mode set terminal v, w of the controller 10 is connected to the output of the dial signal selector switch 32. By the changeover of this switch 32, selection of either DP (Dial Pulse) or MF signal can be made. The mute control terminal x of the controller 10 is connected to the base of the transistor 6 to permit its control of the muting circuit. The LED drive terminal y of the control unit 10 is connected to LED 20 so that the LED 20 flickers when a bell detection signal is received at the terminal q.

This control unit 10 incorporates the dial memory 10A. This dial memory 10A has plural memory areas which are selected by the checkup result data output to the controller 10 from the speech recognition unit 11, and in each memory area, the dial number data are stored in advance. At the time of speech dial origination, according to the collation results data from the speech recognition unit 11, a specific address within the dial memory 10A is selected, and the dial number data stored in this memory area of this selected address is read out, and this read out dial number data is converted into a dial pulse and output from the terminal r, or else from the terminal l when it is converted into a MF signal.

Figure 2:
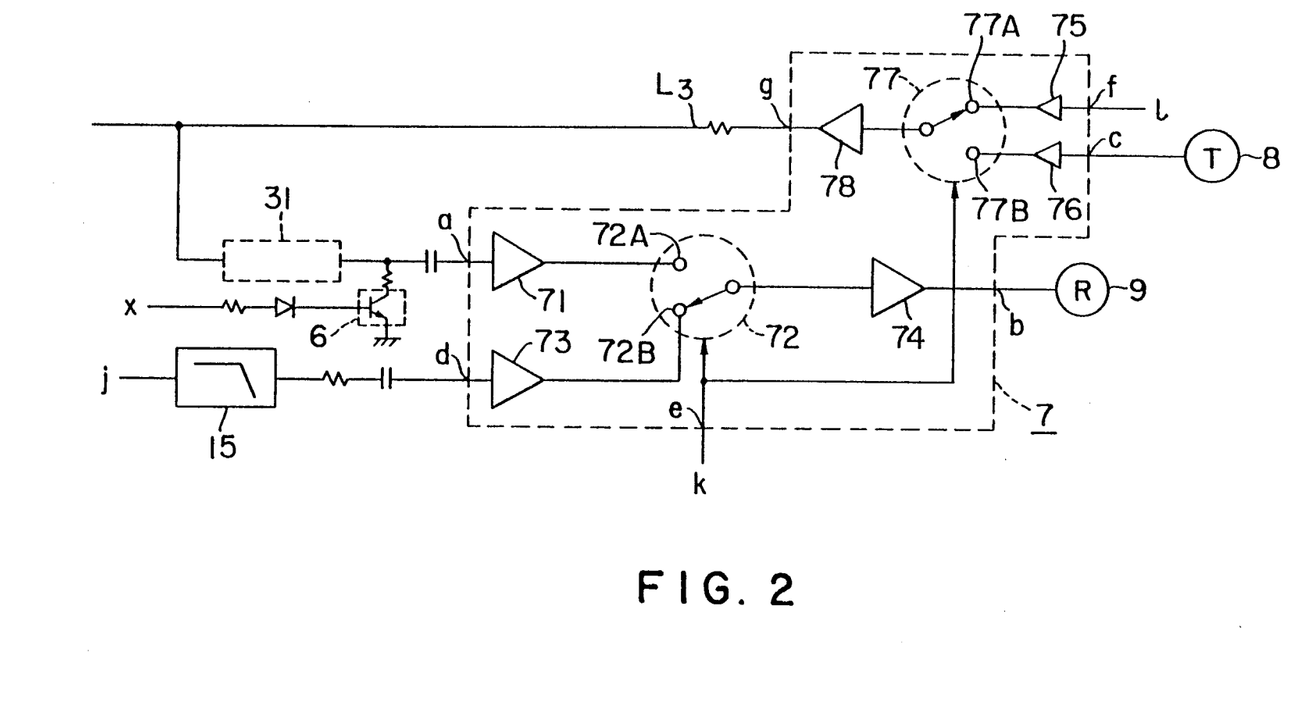
FIG. 2 is a circuit configuration diagram of the speech network for FIG. 1, telephone device.

FIG. 2 is a circuit configuration diagram of the SPN 7 shown in FIG. 1.

In FIG. 2, the received speech input terminal a for receiving the speech signal from the office line $L_1$, $L_2$, is connected to the input of the pre-amplifier 71, whose output is connected to the input terminal 72A of the selector switch 72. The reproduced speech input terminal d is connected to the input of the pre-amplifier 73, whose output is connected to the input terminal 72B of the selector switch 72. The selector switch 72 selects one of the speech signals from the terminal a or d and sends it out to the received speech amplifier 74 by means of the control signal given to the Di/speech selector terminal e from the control unit. The output of the received speech amplifier 74 is connected to the handset receiver 9 via the received speech output terminal b.

The MF signal input terminal f is connected to the input of the pre-amplifier 75, whose output is connected to one of the input terminals, 77A, of the selector switch 77. The telephone transmitter 8 is connected to the input of the pre-amplifier 76 via the transmitted speech input terminal e, and the output of this pre-amplifier 76 is connected to the other input terminal 77B of the selector switch 77. The selector switch 77, is responsive to the control signal given through the terminal e from the controller 10 to select either one of the signals from the terminals f, e, and send it out to the transmitted speech amplifier 78. The output of the transmitted speech amplifier 78 is connected with the speech line $L_3$ via the transmitted speech output terminal g.

Figure 3:
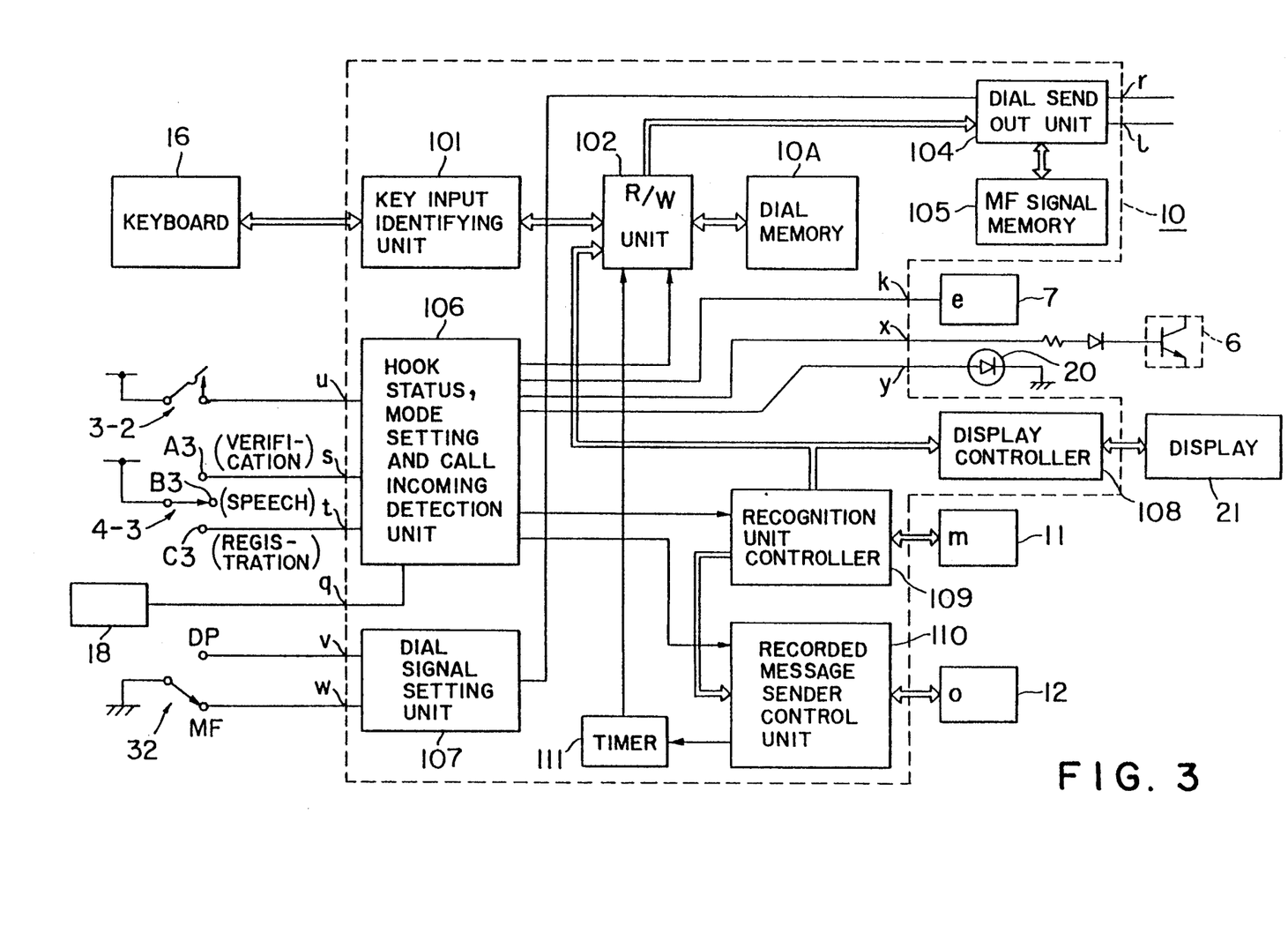
FIG. 3 is a function block diagram of the controller for FIG. 1, telephone device.

FIG. 3 is a block diagram showing the functional configuration of the controller in FIG. 1.

In FIG. 3, the key input identifying unit 101 identifies the pressed key on the keyboard 16, and outputs the corresponding dial data to the read/write unit (hereinafter "R/W unit") 102. The R/W unit 102 is arranged, in the registration mode, to write the dial data input from the key input identifying unit 101 into the dial memory 10A. The R/W unit 102, in the speech mode, upon receipt of the address data output from the recognition control unit 109 described later, reads out the dial data from a memory area of the dial memory 10A as specified by this address data and outputs it to the dial send-out unit 104.

The dial send-out unit 104 receives the dial data from the R/W unit 102 and creates the corresponding dial pulse or MF signal to send it out from the dial pulse send-out terminal r or MF-signal output terminal l. The dial mode set unit 107 receives input signals from the dial mode selector switch 32 at its terminals r, w and is made to specify either the dial pulse mode or the MF signal mode against the dial send-out unit 104.

The recognition unit controller 109 controls the drive of the speech recognition unit 11, and is arranged to output the checkup result data given from the terminal m of the speech recognition unit 11 to the R/W unit 102, display controller 108 and recorded message sender controller 110. The recorded message sender controller 110, in the registration mode, controls the speech recorded message sender 12 to perform the recording operation of the speech signals from the telephone transmitter 8. In the speech mode and verification mode, upon receipt of the collation result data from the recognition unit controller 109, the controller 110 commands the speech recorded message sender 12 to reproduce the speech data corresponding to the collation result data. Further, in the speech mode, upon receipt of the information showing the completion of regeneration from the speech recorded message sender 12, the controller 110 triggers the retrievable timer 111.

When the timer 111 is triggered, the time count for the predetermined time (for example, 3 sec.) is started, and when this time count finishes, a time out signal is output to the R/W unit 102. The R/W unit 102 is triggered by this time-out signal and performs the sendout operation of the dial data as above mentioned.

The display controller 108, on receipt of the checkup result data from the recognition unit controller 109, displays the collation result on the liquid-crystal indicator 21.

The hook-state mode setting and call incoming detector unit 106 are arranged to receive the output of the hook switch 3-2, selector switch 4-3 and bell signal detector circuit 18. The hook-state mode setting and call incoming detection unit 106 are arranged to control the operation of the R/W unit 102, recognition controller 109 and recorded message sender controller 110 on the basis of the hook information from the hook switch 3-2, the mode setting information from the selector switch 4-3 and the call incoming information from the bell detection circuit 18.

The hook-state mode setting and call incoming detection unit 106 are made to perform the call incoming display by the flickering drive of the LED indicator 20, to give also the speech selection signal to the SPN 7 and also to perform the drive control of the muting circuit transistor 6.

Next, the operation of the telephone device with the above-mentioned configuration will be explained. When using this telephone device, first the setting of the registration mode is made, followed next by the setting of each of the verification mode and speech mode in succession, and so explanation will be made in the order of the registration mode, verification mode and speech mode.

Registration Mode

First of all, the selector switch 4-1 to 4-4 is turned to the contacts $C_1$ to $C_4$ corresponding to the registration mode. The SPN 7 operates by the power fed from the power source Vcc. Since the circuit switch 5 is disconnected from the hook switch 3-1 by the selector switch 4-1, it is in the condition of no-turning-ON (namely, the condition not acquiring the office line) even with the handset off-hook.

Figure 4:
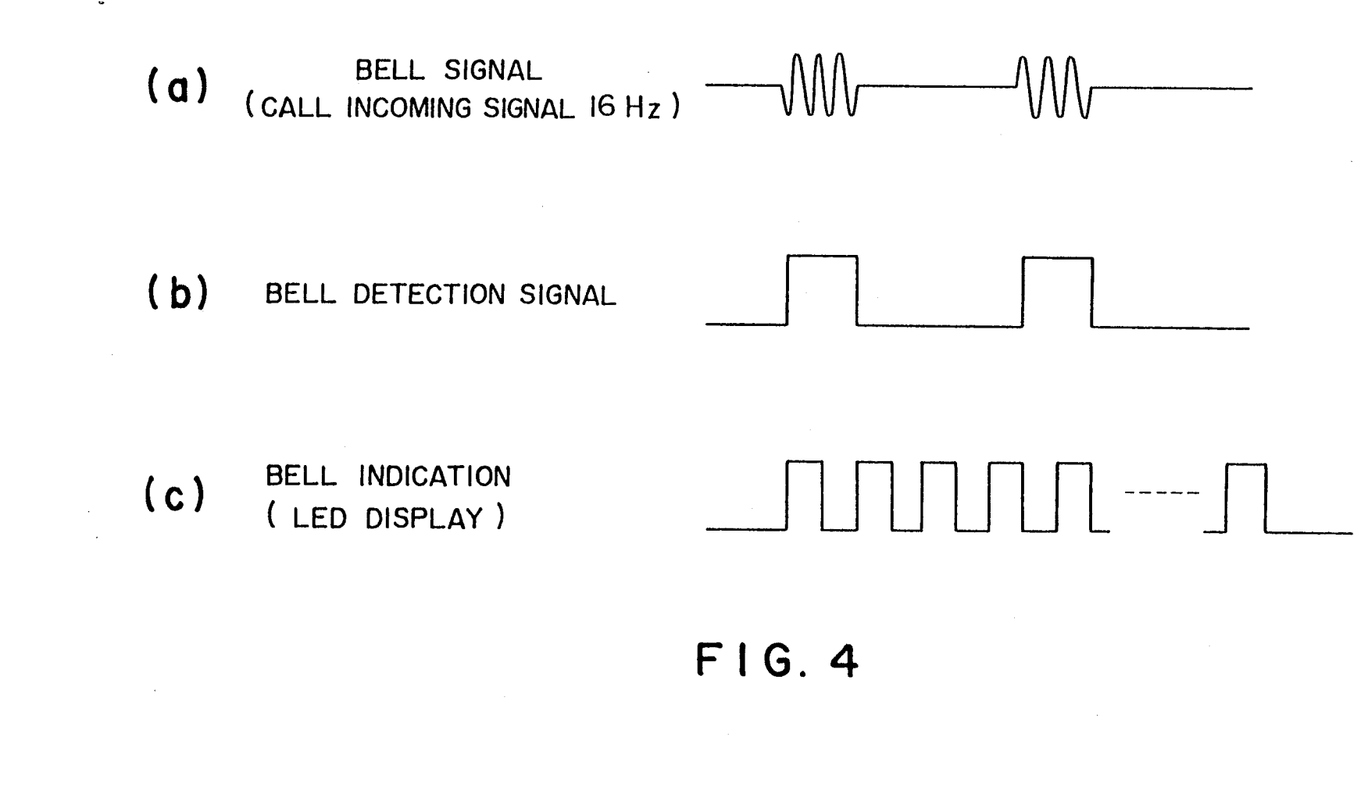
FIGS. 4a-c are timing charts showing the operation at the time of call incoming in the registration mode of FIG. 1, telephone device.

Since the speaker 19 is disconnected from the bell signal generating circuit 17 by the selector switch 4-4, the bell (namely, ringing tone) does not sound even if there is a call incoming. The controller 10 selects the registration mode in response to the signal from the selector switch 4-3, and when, in this mode, the handset is in the off-hook position, by controlling the speech recognition unit 11, analyzes the speech signal from the telephone transmitter 8, has its characteristic data written in the specified area of the memory 13, and moreover, by controlling the recorded message sender 12, and by analog/digital conversion of the speech signal from the telephone transmitter 8, and have it written in the memory 14. Further, the controller 10, by detecting the key pressed in the keyboard, receives the dial data corresponding to that key, and writes it in the dial memory 10A. If there is a call incoming from the office line, the bell signal, as shown in FIG. 4, is generated in the bell generating circuit 17, thereby from the bell detection circuit 8, the bell detection signal shown in FIG. 4(b) is output. Upon receipt of this bell detection signal, the controller 10 lights the LED indicator 20 bit by bit as shown in FIG. 4(c). Since the bell signal generating circuit 17 is disconnected from the speaker 19 by the selector switch 4-4, a ringing tone does not occur.

In this mode, the user first makes the handset off-hook, next inputs from the keyboard 16 the address specifying each memory area (for example, "1"), then inputs the registered dial number and then inputs audibly from the transmitter B the subscriber's name for that dial number. The input dial number is registered on the memory area of the dial memory 10A corresponding to the input address. Further, the speech signal representing the subscriber's name input from the transmitter 8 is sent into the speech recognition unit 11, and the characteristic data as analyzed therein is written into the memory area within the memory 13 which corresponds to the input address. Further, the speech input from the transmitter 8 is also input into the recorded message sender 12, and after an analog/digital conversion, it is written into the memory area within the memory 14 corresponding to the input address. Next, when the user desires to register another subscriber's name and dial number, he should input by operating the keyboard 16 the other address (for example "2") and the dial number followed by the subscriber's name from the transmitter 8. Then, through the process similar to the foregoing, the name and dial number of the next subscriber will be registered. Furthermore, during this registration process, although the handset is in the off-hook position, as the office line acquisition is not made through the circuit switch 5, there will be no registration trouble due to the intrusion of the dial tone into the receiver 9.

Verification Mode

This mode is used to check whether or not the input subscriber's name and dial number are duly registered in the registration mode. First, the selector switch 4-1 to 4-4 is switched over to contacts $A_1$ to $A_4$ corresponding to the verification mode. The SPN 7 is driven by the power fed via the selector switch 4-2 from the power source Vcc. Since the circuit switch 5 is disconnected from the hook switch 3-1 by the selector switch 4-1, the circuit will not be made even if the handset is in the off-hook position (that is, the condition where the office lines are not acquired).

Since the speaker 19 is disconnected from the bell signal generating circuit 17 by the selector switch 4-4, the ringing signal will not come even if there is a call incoming.

The controller 10 selects the verification mode with the signal from the selector switch 4-3, and in this mode, controls the speech recognition unit 11 to analyze the speech signal from the transmitter 8, to collate the characteristic data with the characteristic data stored within the memory 13, and to output the matching characteristic data to the controller 10.

The controller 10 controls the liquid-crystal indicator 21 to display the collation result above-mentioned, and controls the speech recorded message sender 12, by giving the foregoing address to read out the speech data within the memory 14 that corresponds to this address, to make a digital/analog conversion of the speech data and to output the converted data from the terminal j.

Further, when a bell detecting signal is output from the bell detection circuit 18, the controller 10 controls the LED 20 to flicker.

Further, the controller 10 controls the selector switches 72, 77 in the SPN 7 so that a speech signal is sent out from the regenerated speech input terminal d to the receiver 9. That is, the selector switch 72, 77 are set to the position shown in FIG. 2.

In this mode, the user places the handset in the off-hook position, and inputs audibly the subscriber's name already registered from the transmitter 8. The speech signal input from the telephone transmitter 8 is input to the speech recognition unit 11, where it is analyzed to extract the characteristic data. Then, this characteristic data is collated with the data within the memory 13, and the address of the data that has agreed with the input characteristic data is output from the speech recognition unit 11 to the controller 10. The controller 10, by controlling the speech recorded message sender 12, reads out the speech data from the memory area of the memory 14 corresponding to the foregoing address and have it regenerated. The regenerated speech signal as output from the terminal j of the recorded message sender 12 is input to terminal d of the SPN 7. The SPN 7 sends out the speech signal from the terminal d to the receiver 9. The user, by hearing the regenerated speech from the receiver 9, determines whether or not the speech recognition has been duly made. Since at this time, the circuit switch 5 does not acquire the office line, there is no trouble in recognition due to the intrusion of the dial tone into the receiver 9.

Speech Mode

The selector switch 4-1 to 4-4 is changed over to the contacts $B_1$ to $B_4$ to select the speech mode. Since the circuit switch 5 is connected to the hook switch 3-1 by the selector switch 4-1, it becomes turned ON when the handset is made off-hook (that is, acquired state of the main line). The SPN 7 operates by receiving power from the acquired office line. The speaker 19 is connected to the bell signal generating circuit 17 via the selector switch 4-4, and emits a ringing tone at each call incoming.

The controller 10 controls the speech recognition unit 11 and speech regenerating unit 12 to perform the same operations as in the case of the verification mode. Further, the controller 10 receives the address data as the collation result from the speech recognition unit 11 to read out the dial data from the memory area within the dial memory 10A corresponding to this address and generates the corresponding dial pulse or MF signal. The choice between the dial pulse and MF signal is made based on the signal from the selector switch 32. When the controller 10 outputs a dial pulse, the dial pulse is output to the circuit switch 5 to open/close it. When the controller 10 outputs a MF signal, the MF signal is output to the MF signal input terminal of the SPN 7.

The controller 10, from the time when the speech input from the transmitter is started to the time when the collation result is input to the controller 10, keeps the selector switches 72, 77 of the SPN 7 at the position opposite to that shown in FIG. 2. Next, during the time from the output of the checkup result to the finish of the origination, the selector switch 72, 77 are kept in the position shown in FIG. 2, and after completion of the origination, they are again switched over to the position opposite to that shown in FIG. 2. The controller 10 turns ON the muting circuit transistor 6, after the lapse of a few seconds (for example, 2-3 sec.) from the time the handset is made off-hook, to form a mute state.

In this mode, the user first picks up the handset (off-hook) and next presses the key 16A to set up the speech originating mode. Then, the switch 5 is turned ON to acquire the office line and the selector switch 72, 77 of the SPN 7 is turned to the terminal a side to transfer the speech signal from the office line to the receiver 9. Therefore, the dial tone from the office line is input to the receiver 9, and the user, by hearing this dial tone, recognizes, that the office line has been acquired. After 2-3 sec, the transistor 6 acting as the muting circuit, is turned ON, and the dial tone from the office line is eliminated. Thus, the feedback of the dial tone from the receiver 9 to the transmitter 8 can be blocked. In this condition, when the user inputs audibly the subscriber's name into the transmitter 8, this speech signal is input to the speech recognition unit 11. In the speech recognition unit 11, the input speech signal is analyzed to create its characteristic data which is collated with the data stored in each memory area within the memory 13. Then, the address of the memory having data stored therein that, matches the characteristic data of the input speech signal, is output to the controller 10. The controller 10, on receipt of the address from the speech recognition unit, controls the received message sender 12 to reproduce the speech signal stored in the memory area within the memory 14 that corresponds to the address, and changes over the selector switch 72, 77 of the SPN 7 so that the reproduced speech signal from the recorded message sender 12 is transferred to the receiver 9. As a result, the speech data is read out from the aforementioned memory area of the memory 14, converted into an analog speech signal and input into the SPN 7. This reproduced speech signal is sent out to the receiver 9 from the SPN 7. The user, upon hearing the reproduced speech signal, verifies whether or not the speech recognition has been duly performed. The controller 10, upon receipt of the information showing the completion of the reproduction from the recorded message sender 12, starts a time count for a predetermined time (for example, 3 sec.). In case the speech recognition has not been duly made, the user returns the handset to the on-hook status while the time count is going on, thereby forestalling the sendout of wrong dial numbers. When the predetermined time mentioned above elapses without the handset being returned to on-hook, the controller 10 reads out the dial data corresponding to the foregoing address from the dial memory 10A and outputs it in dial pulse or MF signal fashion. For example, when a MF signal is output from the controller 10, this MF signal is sent to the SPN 7. At this time, since the SPN 7 is set to the status shown in FIG. 2, the MF signal is output from the transmitted speech output terminal g to the plus side speech line $L_3$, thereby the origination is made. On the other hand, when the dial pulse is output from the controller 10, the ON/OFF of the switch 5 is repeated by this dial pulse, thereby the dial pulse is sent out to the office line.

Incidentally, after completion of the reproduction, when the user inputs the word "Yes" or "No" from the transmitter, the word is speech recognized, and such a configuration as to determine whether or not to perform the origination according to that recognition result is also available. In this case, into the memory 13, the characteristic data for recognition of "Yes" or "No" are stored in advance, and the controller 10, after completion of the reproduction, controls the speech recognition unit 11 to collate the input speech signal with the characteristic data—the abovementioned "Yes" or "No"—.

On completion of the origination, the controller 10 changes over the selector switches 72, 77 of the SPN 7 to the position opposite to the status shown in FIG. 2. Namely, thereby both the transmitter 8 and receiver 9 are connected to the speech line $L_3$, $L_4$, thus the conversation is set up. At the same time, the controller 10 turns off the transistor 6 as the muting circuit, thus making it possible to transmit duly the speech signals from the office line to the receiver 9.

When the handset is made off-hook, unless the speech origination key 16A is pressed, the speech origination mode as aforenoted is not set up, but the ordinary manual-key dial-origination mode is set up.

The scope of this invention shall not be limited to the preferred embodiment as abovementioned. This invention is applicable not merely to the telephone equipment like the preferred embodiment but also to the wide use in various kinds of telephone terminal devices. Furthermore, it is applicable not only to the terminal device that performs dial origination in answer to the speech recognition results but also to the terminal device that performs other functions (for example, message reproduction in an automatic answering telephone set) in answer to the results of speech recognition.

What is claimed is:

1. A telephone terminal device, comprising:
   a transmitter microphone;
   a receiver;
   mode selector means for selecting between a registration mode and a speech mode;
   a speech recognition unit for analyzing speech signals received from said transmitter microphone and storing analysis data when the telephone terminal device is in the registration mode, and for recognizing speech signals received from said transmitter microphone by comparing the speech signals with the analysis data that has been stored beforehand when the telephone terminal device is in the speech mode;

hook detector means for detecting a hook status;

switch means, connected between a telephone network and said receiver, for disconnecting said receiver from the telephone network when the telephone terminal device is in the registration mode, and for connecting said receiver to the telephone network when an off-hook status is detected by said hook detector means and the telephone terminal device is in the speech mode;

a controller for generating a control signal when said speech recognition unit is receiving said speech signal from said transmitter microphone, the off-hook status is detrected by hook detector means, and the telephone terminal device is in the speech mode; and signal level reducing means responsive to said control signals for reducing the level of signals sent from the telephone network to said receiver.

2. A telephone terminal device as claimed in claim 1, wherein said signal level reducing means is a switching device which is turned on in response to said control signal, so that the signals from said telephone network are prevented from reaching said receiver.

3. A telephone terminal device, comprising:

a telephone receiver;

a transmitter microphone;

mode selector means for selecting between a registration mode and a speech mode;

a speech recognition unit for analyzing speech signals received from said transmitter microphone and storing analysis data when the telephone terminal device is in the registration mode, and for recognizing speech signals received from said transmitter microphone by comparing the speech signals with the analysis data that has be stored beforehand when the telephone terminal device is in the speech mode;

speech reproduction means for reproducing speech information previously stored in a memory in response to recognition results from said speech recognition unit, and for sending said speech information to said telephone receiver;

a hook detector means for detecting a hook status;

switch means, connected between a telephone network and said telephone receiver, for disconnecting said telephone receiver in the registration mode, and for connecting said telephone receiver to the telephone network when an off-hook status is detected by said hook detector means and the telephone terminal device is in the speech mode;

a controller for generating a control signal when the speech information from said speech reproduction means is being reproduced during the time that the off-hook status is detected by said hook detector means and when the telephone terminal device is in the speech mode; and means, responsive to said control signal, for connecting said speech reproduction means to said telephone receiver so that said speech information from said speech reproduction means is sent to said telephone receiver, and for preventing transmission of speech signals from said telephone network into said telephone receiver.

4. A telephone terminal device as claimed in claim 3 further comprising:

timer means for measuring a predetermined time interval after completion of reproduction of said speech information, and means for executing predetermined operations corresponding to said recognition results sent from said speech recognition unit upon receipt of information indicating passage of time interval from said timer means.

5. A telephone terminal device as claimed in claim 3 further comprising:

means for controlling said speech recognition unit after completion of reproduction of said speech information to execute speech recognizing operations for determining whether a predetermined speech signals are input into said speech recognition unit or not, and means for excuting predetermined operations corresponding to said recognition results upon receipt from said speech recognition unit of information indicating that said predetermined speech signals are input.

6. A telephone terminal device, comprising:

a transmitter microphone;

a bell signal generating circuit for detecting an incoming call from a telephone network, and for generating bell signals;

an electroacoustic transducer for receiving said bell signals and for generating ringing tones;

selector means for selecting between a registration mode and a speech mode;

a speech recognition unit for analyzing speech signals received from said transmitter microphone and storing analysis data when the telephone terminal device is in the registration mode, and for recognizing speech signals received from said transmitter microphone by comparing the speech signals with the analysis data that has been stored beforehand when the telephone terminal devcie is in the speech mode;

hook detector means for detecting a hook status;

switching means for opening and closing a direct current loop for the telephone network, said switching means maintaining the direct current loop current in an open state when the telephone terminal device is in the registration mode, and closing the direct current loop when an off-hook status is detected by said hook detector means and the telephone terminal device is in the speech mode;

a controller for generating a control signal when the incoming call is detected while said speech recongnition unit is receiving speech signals from said transmitter microphone while the telephone terminal device is in the registration mode;

preventing means, responsive to said control signal, for preventing transmission of said bell signals from said bell signal generating circuit to said electroacoustic transducer when the telephone terminal device is in the registration mode; and display means, responsive to said control signal, for effecting a visible display indicating the reception of the incoming call.

7. A telephone terminal device as claimed in claim 6 further comprising a visible display means for receiving said bell signals and converting them into visible signals.

8. A telephone terminal device, comprising:
a transmitter microphone;
a receiver;
mode selector means for selecting between a verification mode and a speech mode;
a speech recognition unit for recognizing speech signals received from said transmitter microphone when the telephone terminal device is in either the verification mode or the speech mode;
hook detector means for detecting a hook status;
switch means, connected between a telephone network and said receiver, for disconnecting said receiver from the telephone network when the telephone terminal device is in the verification mode, and for connecting said receiver to the telephone network when an off-hook status is detected by said hook detector means and the telephone terminal device is in the speech mode;
a controller form generating a control signal when said speech recognition unit is receiving said speech signals from said transmitter microphone, the off-hook status is detected by said hook detector means, and the telephone terminal device is in the speech mode; and
signal level reducing means responsive to said control signal for reducing the level of signals sent from the telephone network to said receiver.

9. A telephone terminal device, comprising:
a telephone receiver;
a transmitter microphone;
mode selector means for selecting between a verification mode and a speech mode;
a speech recognition unit for recognizing speech signals received from said transmitter microphone when the telephone terminal device is either in the verification mode or the speech mode;
speech reproduction means for reproducing speech information previously stored in a memory in response to recognition results from said speech recognition unit, and for sending said speech information to said telephone receiver;
hook detector means for detecting a hook status;
switch means, connected between a telephone network and said telephone receiver, for disconnecting said telephone receiver from the telephone network when the telephone terminal device is in the verification mode, and for connecting said telephone receiver to the telephone network when an off-hook status is detected by said hook detector means and the telephone terminal device is in the speech mode;
a controller for generating a control signal when the speech information from said speech reproduction means is being reproduced during the time that the off-hook status is detected by said hook detector means and when the telephone terminal device is in the speech mode; and
means, responsive to said control signal, for connecting said speech reproduction means to said telephone receiver so that said speech information from said speech reproduction means is sent to said telephone receiver, and for preventing transmission of speech signals from said telephone network into said telephone receiver.

10. A telephone terminal device, comprising:
a transmitter microphone;
a bell signal generating circuit for detecting an incoming call from a telephone network, and for generating bell signals;
an electroacoustic transducer for receiving said bell signals and for generating ringing tones;
selector means for selecting between a verification mode and a speech mode;
a speech recognition unit for recognizing speech signals received from said transmitter microphone when the telephone terminal device is either in the verification mode or the speech mode;
hook detector means for detecting a hook status;
switching means for opening and closing a direct current loop for the telephone network, said switching means maintaining the direct current loop in an open state when the telephone terminal device is in the verification mode, and closing the direct current loop when an off-hook status is detected by said hook detector means and the telephone terminal device is in the speech mode;
a controller for generating a control signal when the incoming call is detected while said speech recognition unit is receiving speech signals from said transmitter microphone while the telephone terminal device is in the verification mode;
preventing means, responsive to said control signal, for preventing transmission of said bell signals from said bell signal generating circuit to said electroacoustic transducer when the telephone terminal device is in the verification mode; and
display means, responsive to said control signal, for effecting a visible display indicating the reception of the incoming call.

* * * * *

UNITED STATES PATENT AND TRADEMARK OFFICE
CERTIFICATE OF CORRECTION

PATENT NO. : 5,111,501
DATED : May 05, 1992
INVENTOR(S) : MASANOBU SHIMANUKI

It is certified that error appears in the above-indentified patent and that said Letters Patent is hereby corrected as shown below:

TITLE PAGE:

Abstract, line 5, change "send" to --sent--.
Claim 1, column 11, line 18, change "signal" to --signals--.
Claim 1, column 11, line 19, change "detrected by" to --detected by said--.
Claim 1, column 11, line 23, change "signals" (first occurence) to --signal--.
Claim 3, column 11, line 42, change "be" to --been--.
Claim 3, column 11, line 50, delete "a" (first occurence).
Claim 3, column 11, line 53, before "in" insert --from the telephone network when the telephone terminal device is--.
Claim 4, column 12, line 11, before "time interval" insert --said--.
Claim 5, column 12, line 21, change "excuting" to --executing--.
Claim 6, column 12, line 43, change "devcie" to --device--.
Claim 6, column 12, line 49, after "loop" delete "current".
Claim 6, column 12, line 57 to 58, change "recongnition" to --recognition--.

UNITED STATES PATENT AND TRADEMARK OFFICE
CERTIFICATE OF CORRECTION

PATENT NO. : 5,111,501
DATED : May 05, 1992
INVENTOR(S) : MASANOBU SHIMANUKI

It is certified that error appears in the above-indentified patent and that said Letters Patent is hereby corrected as shown below:

Claim 8, column 13, line 22, change "form" to --from--.

Signed and Sealed this

Fourteenth Day of December, 1993

Attest:

BRUCE LEHMAN

*Attesting Officer*     *Commissioner of Patents and Trademarks*